United States Patent [19]

Fenter et al.

[11] Patent Number: 4,460,951
[45] Date of Patent: Jul. 17, 1984

[54] CONTROL CIRCUIT ARRANGEMENT FOR A SELF-START POWER SUPPLY

[75] Inventors: William S. Fenter, Marlboro; Arthur E. Schott, Billerica, both of Mass.

[73] Assignee: Honeywell Information Systems Inc., Waltham, Mass.

[21] Appl. No.: 394,060

[22] Filed: Jul. 1, 1982

[51] Int. Cl.³ .......................................... H02M 3/335
[52] U.S. Cl. ...................................... 363/49; 363/21; 323/901
[58] Field of Search ................................. 363/18–21, 363/49, 97; 323/901, 285–287, 299

[56] References Cited

U.S. PATENT DOCUMENTS 4,037,271 7/1977 Keller ............................... 363/80 X
4,063,307 12/1977 Stephens ................................ 363/21
4,246,634 1/1981 Purol ..................................... 363/49

OTHER PUBLICATIONS

C. J. Palmucci, "Switching Regulator Start-up Circuit", IBM Technical Disclosure Bulletin, vol. 19, No. 3, Aug. 1976.

Primary Examiner—Peter S. Wong
Attorney, Agent, or Firm—Faith F. Driscoll; Nicholas Prasinos

[57] ABSTRACT

A switching regulator power supply operates at a variable high frequency with low power dissipation and a minimum of complexity. The transformer primary windings are included as part of a self-starting circuit which starts a pulse generator having a fixed frequency and variable pulse width. The self-starting circuit includes a control circuit network which connects to the transformer primary windings and a low voltage regulator circuit connects to the pulse generator and network. The control circuit network provides the voltage regulator circuit with the desired current characteristics of high instantaneous current during a short turn-on time interval and a zero current during power supply operation. The self-starting circuit in response to the input rectified AC power after the short turn-on period of time applies sufficient voltage which enables the pulse generator to begin generating a first output pulse. This causes the primary windings to store energy and feedback energy to the self-starting circuit which increases the voltage applied to the generator causing it to begin normal operation at maximum pulse width. The output DC supply voltage is compared to a reference voltage for generating an error signal which is used to adjust the width of the pulse generator to existing line and load conditions during power supply operation.

34 Claims, 11 Drawing Figures

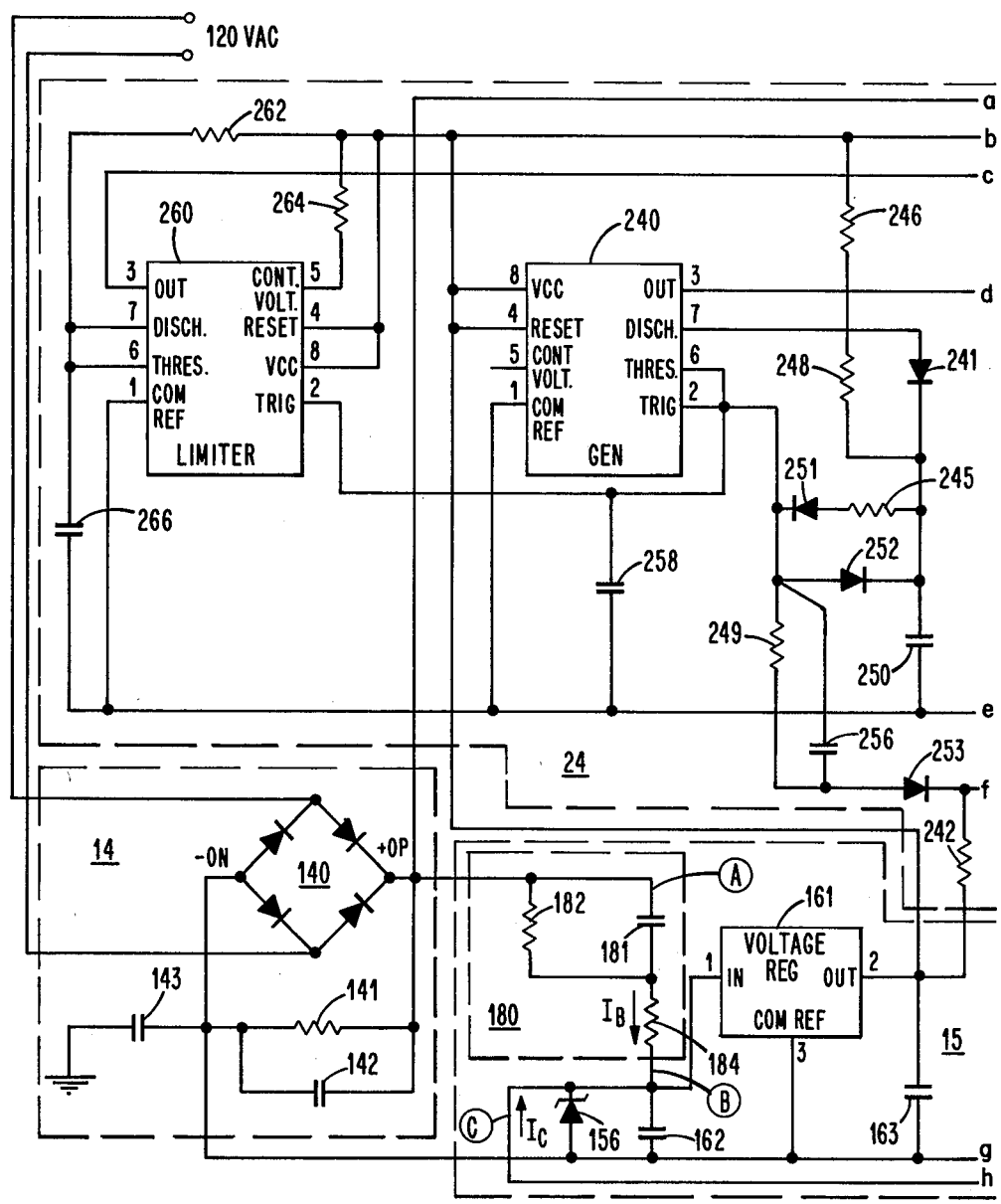
Fig. 2 (sheet 1 of 2)

CONTROL CIRCUIT ARRANGEMENT FOR A SELF-START POWER SUPPLY

BACKGROUND OF THE INVENTION

1. Field of Use

The present invention relates to apparatus for converting AC voltages to relatively low level DC voltages and more particularly to switching regulator power supply apparatus.

2. Prior Art

In general, computer equipment and associated peripheral equipment include their own internal power supplies. Such supplies are used to convert AC line voltages having the voltage ranges of 95–132 volts and frequencies of 50–60 Hertz into required DC voltages of 5–24 volts. In operation, these supplies generally rectify the AC line voltages which are applied to the primary windings of a step down transformer. The voltages induced in the secondary windings of the transformer are filtered and averaged to obtain the desired values of DC voltages.

As computer equipment and peripheral equipment become more compact and smaller in size, it becomes necessary to reduce the size weight and power requirements of the internal power supplies utilized therein. One approach has been to reduce the complexity of the high frequency switching circuitry associated with primary windings of the transformer. Examples of this approach are illustrated in U.S. Pat. Nos. 3,924,172, 4,055,790 and 4,128,867.

While the arrangements described in the above patents reduce the circuit complexity in this part of the power supply, the arrangements normally require additional circuitry which include separate line frequency transformers which power the control pulse circuits connected between the primary and secondary transformer windings. These arrangements may also include feedback circuits which couple to the line frequency transformer or bias transformer and circuits for providing power to operate the control circuitry during power supply operation.

To reduce the power dissipation of a switching regulator power supply, the arrangement disclosed in the copending patent application of William S. Fenter titled "Self Start Flyback Power Supply", Ser. No. 279,108, filed on June 30, 1981, now U.S. Pat. No. 4,400,767, has been employed with success. Such arrangement includes a self-starting circuit for a pulse generator circuit which generates fixed width pulses at a variable frequency rate. By controlling the rate at which the pulse generator circuit generates fixed width pulse in turn establishes the number of energy storage cycles required for maintaining desired values of power supply voltages as a function of load conditions thereby minimizing power dissipation.

It has been found that in certain applications, the self-starting circuit in the above arrangement dissipated too much power resulting in lower supply efficiency. Such applications include those specifying no air circulation equipment, termed the no fan requirement accompanied by an enclosed housing, and higher values of input AC voltages. Also, it was found that any power dissipation in such applications was so magnified that it produced overheating problems within the power supply itself.

It is well known to employ active circuits in the form of transistors or transformer control circuit arrangements in power supplies for controlling the turn-on of such supplies. However, the transistor arrangement while providing control has the disadvantage of dissipating power during supply operation. Moreover, when there is a requirement for providing high values of turn-on current, the size and power dissipation characteristics of the transistors increase adding to circuit complexity.

The transformer control arrangement while reducing power dissipation, has the disadvantage of requiring additional circuits adding considerably to supply complexity and expense. Also, when there is a requirement for providing high values of turn-on current, the size of the control transformer increases further adding to circuit complexity.

Accordingly, it is a primary object of the present invention to provide a light weight, compact and efficient power supply.

It is a further object of this invention to provide a switching regulator power supply which minimizes power consumption during normal operation.

It is still a further object of the present invention to provide a switching regulator power supply which is easily constructed in integrated circuit form.

SUMMARY OF THE INVENTION

The above objects are achieved in a preferred embodiment of the switching regulator power supply of the present invention which includes a self-starting circuit for a pulse generator circuit which generates variable width pulses at a fixed frequency rate.

The self-starting circuit includes a control circuit network which connects to the primary windings of the transformer to which the rectified AC power is applied, a switching power circuit and a low voltage regulator circuit. The control circuit network is connected to provide the desired current characteristics for operating the voltage regulator circuit in response to the rectified AC power. That is, the control circuit network provides high instantaneous current during a short turn-on time interval and zero current during power supply operation. In response to the high instantaneous current, the regulation circuit operates to apply an output voltage signal during the turn-on period of time which starts the pulse generator circuit operation.

The output voltage generated by the generator circuit switches on the power circuit causing current to flow through one of the transformer primary windings and a portion feedback through another feedback primary winding to the voltage regulator circuit causing it to condition the pulse generator circuit to operate within its normal range. At the end of each pulse, the power circuit switches off preventing further current flow within the transformer primary windings. In the preferred embodiment, this causes current to flow in the opposite direction which produces a voltage in the secondary windings of the transformer so polarized so as to transfer energy to the loads connected thereto.

The preferred embodiment further includes a voltage to pulse width converter circuit which monitors the secondary power supply output voltage. The converter circuit generates an output pulse voltage signal during each cycle of operation whose width is a function of the relationship of the secondary power supply voltage to a reference voltage. The output pulse signal is coupled through an optical coupler circuit. When the secondary voltage is less than a reference voltage, the output pulse switches on the optical coupler circuit which triggers the pulse generator circuit causing it to generate a pulse having a longer pulse.

By controlling the width of the pulses generated by the pulse generator circuit in turn establishes the duration of energy storage cycle required for maintaining desired values of power supply voltages as a function of line and load conditions.

The preferred embodiment of the present invention can also include a voltage to frequency converter circuit. Here, the converter circuit monitors the secondary power supply voltage and generates a voltage error signal which is coupled through the optical coupler circuit for controlling the frequency of the pulse generator circuit. When the error signal indicates that the secondary voltage is higher than the reference voltage, the optical coupler is switched on which inhibits the pulse generator circuit from generating further pulses. By controlling the rate at which the pulse generator generates fixed width pulses in turn establishes the number of energy storage cycles required for maintaining desired values of power supply voltages as a function of load conditions.

This, in turn, minimizes the power requirements of the power supply circuits and maximizes efficiency. Utilizing optical coupling in lieu of transformer coupling for controlling the turn-on of the pulse generator circuit further reduces circuit complexity.

In accordance with the teachings of the present invention, the control circuit network is constructed from passive capacitive and resistive elements. One end of the control circuit network is connected to receive the AC rectified and filtered line voltage while the output of control circuit network is connected to drive the low voltage regulator circuit. In response to the AC rectified and filtered line voltage, the capacitive element of the control circuit network begins charging. The charging current is applied to the low voltage regulator circuit. The size of the capacitive element is selected so that sufficient energy/current is made available to the low voltage regulator circuit at maximum load conditions during the short turn-on interval for causing the voltage regulator circuit to generate the desired value of output voltage for switching on the pulse generator circuit (i.e., the load). At the end of the turn-on interval, the capacitive element is fully charged. Therefore, the control circuit network dissipates no energy during the operation of the supply.

The preferred embodiment of the control circuit network further includes a resistive element in series with capacitive element which limits the value of current during the turn-on interval to prevent any possibility of damage to the voltage regulator circuit. Also, another resistive element connects in parallel with the capacitive element of the network and provides a discharge path. This enables the power supply to be easily restarted following shutdown.

The control circuit network and low voltage regulator circuit of the preferred embodiment minimizes power during power supply operation. Also, the regulator circuit, pulse generator and error circuit can be constructed from standard integrated circuits which further adds to the compactness of the power supply.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
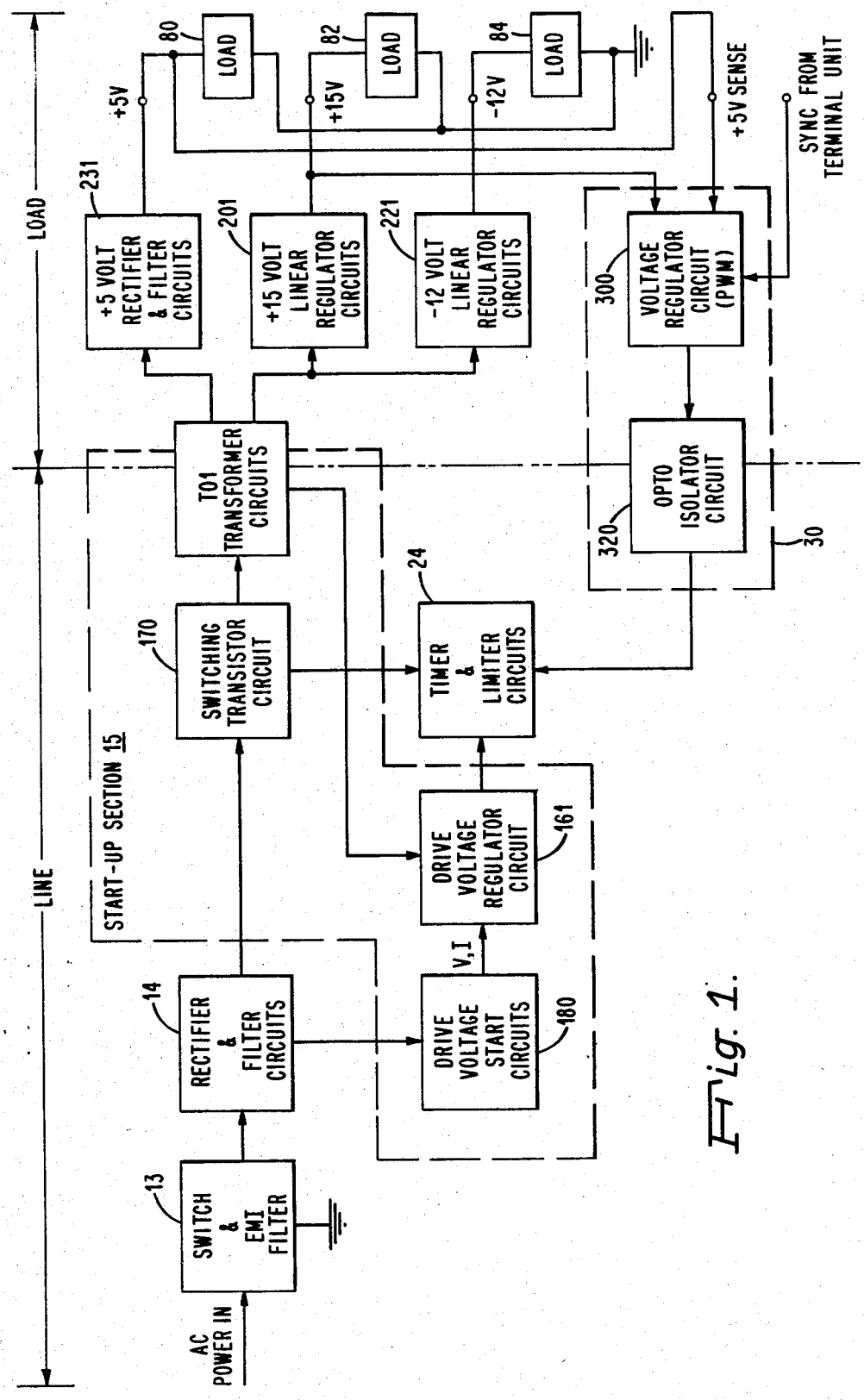
FIG. 1 is a block diagram of the regulated power supply of the present invention.

FIG. 1 illustrates in block diagram form, the preferred embodiment of the switching regulator power supply of the present invention. As shown, AC power is applied via the switch and EMI filter of block 13 to the circuits of block 14. The output AC rectified power is applied to the start-up circuit section of block 15. This section which includes the drive voltage start circuits and power switching the primary energy storage circuits applies an initial output voltage to the variable pulse width generator circuit of block 24 sufficient to start it operating. The generator circuit 24 generates an output voltage which enables the primary energy storage circuits to store energy and feed energy back to the start-up circuit which produces an output voltage sufficient for normal operation of the generator circuit 24.

At the end of each pulse, the primary storage circuits of block 15 transfer energy to the secondary transfer circuits of blocks 201, 221 and 231 which the desired +15VDC, −12VDC and +5VDC output voltages which are delivered to the loads represented by blocks 80, 82 and 84. In the preferred embodiment, the different loads 80, 82 and 84 correspond to the circuits of a CRT display terminal unit. The circuits of block 30 compare the power supply output voltage with a +5 V reference voltage from the circuits of block 300 and generate an output pulse which controls the pulse width of the generator circuit of block 24. Also, the operation of the circuits of block 30 may be connected to by synchronized by the terminal unit which includes the power supply of the present invention.

Figure 2:
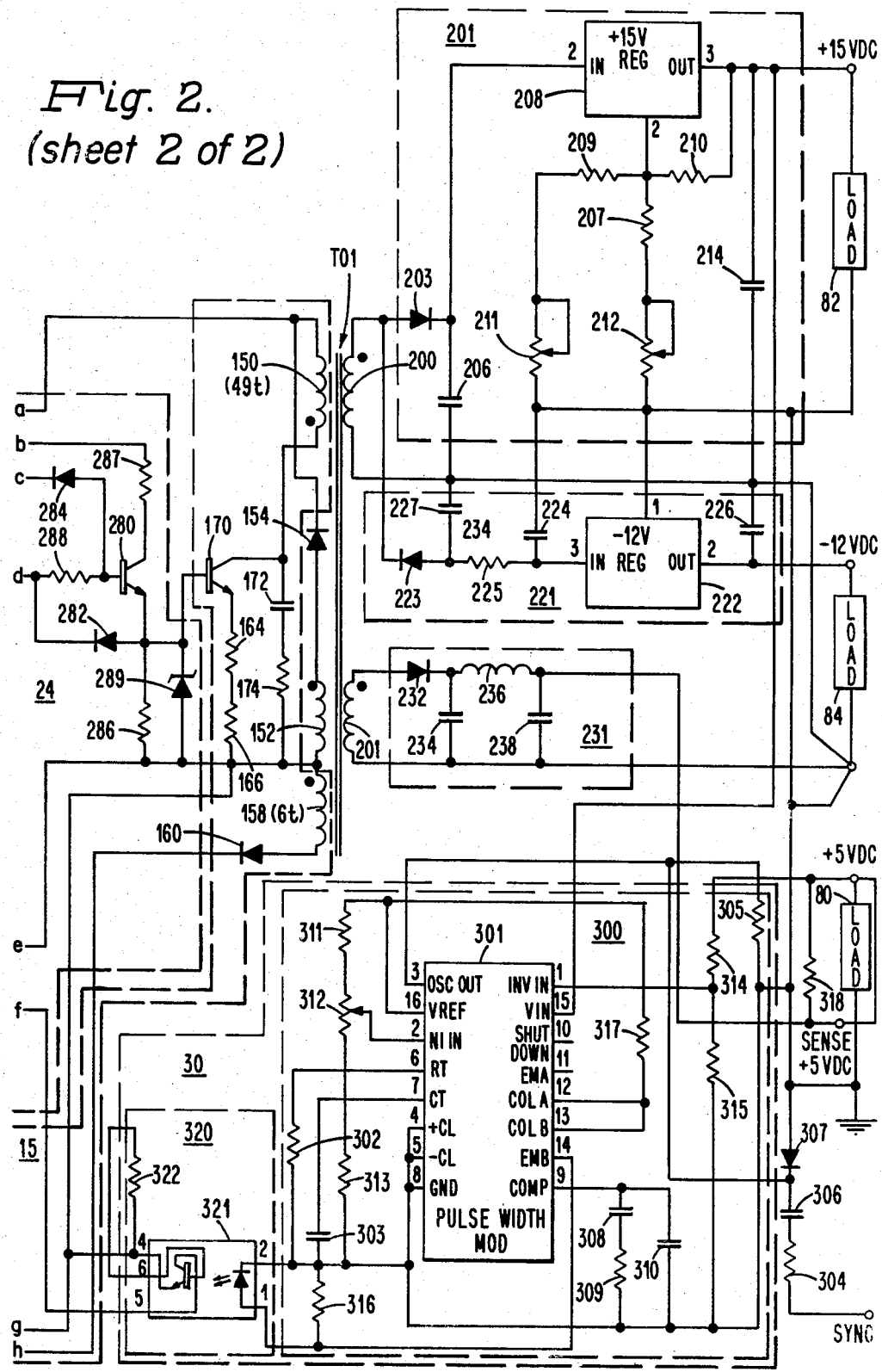
FIG. 2 shows in greater detail the blocks of FIG. 1.

FIG. 2 shows in greater detail, the circuits of each of the blocks of FIG. 1.

Power Circuit 14

As seen from FIG. 2, the power circuits of block 14 include the four rectifier diodes connected as a full wave rectifier bridge 140, a filter capacitor 142, a discharge resistor 141 and a noise decoupling capacitor 143. The rectifier AC is applied via positive and negative output terminals OP and ON to filter capacitor 142. The capacitor 142 output voltage is applied to the start-up section of block 15.

Start-Up Section 15

The start-up section of block 15 includes primary windings 150 and 158 of a transformer TO1, a start control circuit network 180, including capacitor 181, diode 156, resistor 182 and series resistor 184, a power switching transistor 170 and its associated resistors and capacitors 164, 166, 172 and 174 which connect as shown and a low controlled voltage regulator circuit 161 with associated zener diode and capacitors 156, 162 and 163. The start control network resistor 184 connects to circuit 161 in common with a primary feedback winding 158 and series diode 160. The start control circuit network includes capacitor 181 which connects to AC filter capacitor 142 controls the amount of current applied to voltage regulator circuit 161, as explained herein. Capacitors 162 and 163 serve to filter any noise signals appearing at the input and output of circuit 161.

The primary windings 150 and 158 are wound with the polarities as shown by the dots. The remaining primary winding 152 with the indicated dot polarity together with series connected diode 154 operates as a snubber network during power supply operation. That is, it cancels out the effect of the voltage spikes or transients caused by load conditions resulting from transformer leakage inductances. Hence, it is not considered as part of the start-up circuit 15. As indicated in FIG. 2, the primary feedback winding 158 has fewer number of turns as compared to winding 150 so as to provide a 49 to 6 turns ratio. This permits the appropriate amount of energy to be fed back to the other circuits within start-up circuit 15 for completing the start-up operation of circuit 240.

The voltage regulator circuit 161 of the preferred embodiment is constructed from an IC voltage regulator having the designation uA7812 described fully in the publication "Voltage Regulator Handbook", published by Fairchild Camera and Instrument Corporation, Copyright 1978. The input starting current and voltage is applied to input terminal 1 from the output of control start network formed by resistors 182 and 184 and capacitor 181. When the input signal at terminal 1 reaches a value of current of approximately 16 milliamperes and a voltage between 4.5–5 V, the circuit 161 produces an output voltage at output terminal 2 sufficient to begin the operation of the pulse generator circuit 240.

It will be appreciated that the regulator circuit 161 continues to produce an output voltage which is proportional to the input voltage. When the input voltage produces the desired output value, here 12 volts, any further change in input voltage causes no change in output voltage. While other circuit arrangements can be utilized to provide a similar mode of operation (e.g. voltage source and zener diode), they require additional power thus reducing power supply efficiency.

Circuits 24

As seen from FIG. 2, the circuits of block 24 include a variable pulse width generator 240, a pulse width limiter circuit 260 and an output drive transistor gate circuit 280. The generator 240 connects to an input network of resistors 245, 246, 248 and 249, diodes 241, 251 through 253 and capacitors 250, 256 and 258. The voltage limiter circuit 260 includes resistors 262 and 264 and capacitor 266. The output transistor gate circuit 280 includes diodes 282 and 284, resistors 286 through 288 and a zener diode 289.

Pulse Generator 240

The generator 240 of the preferred embodiment is constructed from an LM555 timer circuit manufactured by major integrated circuit manufacturers. the terminals 2 and 6 of generator circuit 240 connect together so that circuit 240 when enabled as explained herein can trigger itself and free run as a multivibrator. The voltage generated by voltage regulator circuit 161 is applied to the supply voltage terminal 8 of circuit 240. Terminal 1 connects the internal circuits to the common reference potential at point ON as shown.

Under the control of regulator circuit 161, the supply voltage of generator circuit 240 is varied between 3.5 volts and 12 volts during start-up. Under the control of regulator circuit 161, the capacitor 250 connected to trigger terminal 2 and between threshold input terminal 6 charges through resistor 245 and diode 241 toward the value of supply voltage and discharges through resistor 248. The diode 241 which connects across resistor 248 is forward biased during its charging of capacitor 250 and reverse biased during its discharge through terminal 7 (i.e., terminal 7 provides a discharge path to ground through a transistor). The charge time corresponds to the period during which output terminal 3 is high. The discharge time corresponds to the period during which output terminal 3 is low.

As seen from FIG. 2, the threshold terminal 6 of circuit 240 also connects in series with the network which consists of decoupling capacitor 256, diode 253 and resistors 246. The resistor 242 is a load resistor which provides a small current flow through the coupler output transistor to enhance its switching speed (i.e., a biasing current to establish a desired operating point).

As explained herein, when an optical coupler circuit 320 of block 30 turns on, resistor 249 and diode 253 apply a negative going voltage to terminals 2 and 6 by placing the cathode of diode 253 at approximately zero volts. This triggers generator 240. When the optical coupler is switched off, diode 253 is backbiased and capacitor 250 controls the retriggering of generator 240. The diodes 251 and 252 ensure that the operation of the generator RC network is not affected by switching the voltage applied to terminals 2 and 6 (i.e., makes the voltage applied to terminals 2 and 6 by the optical coupler circuit 350 independent of the RC time constant of generator 240).

During start-up in the absence of triggering from coupler circuit 320, as soon as sufficient voltage is applied to terminal 8, capacitor 250 begins to charge at which time circuit 240 applies a positive voltage to output terminal 3. When the voltage applied to terminal 6 reaches a predetermined threshold, this causes circuit 240 to switch its output terminal 3 to a low voltage. At this time, circuit 240 enables capacitor 250 to discharge toward zero volts. Upon being discharged to a predetermined voltage, circuit 240 triggers itself.

Pulse Width Limiter Circuit 260

The limiter circuit 260 is also constructed from an LM555 timer circuit. It is connected to operate as a one-shot circuit. Terminals 4 and 8 are connected in common to the output terminal 2 of regulator circuit 161 in parallel with generator 240. The threshold input 6 is connected in common with discharge terminal 7 to timing capacitor 266 and timing resistor 262. A control voltage terminal 5 is connected through resistor 264 to output terminal 2 of regulator circuit 161. Terminal 1 is connected in the same manner as terminal 1 of generator 240.

When terminal 2 is switched from a positive to a voltage approximating zero volts, this negative going signal triggers circuit 260 which results in the generation of an output pulse having a predetermined pulse width. The pulse width is selected to be approximately 21 microseconds which is less than 50% of the operating cycle of the power supply. Thus, the pulse width of the limiter circuit 260 establishes the duration of the maximum energy storage cycle.

Transistor Gate Circuit 280

As seen from FIG. 2, the output pulses from generator 240 and limiter circuit 260 are applied to the emitter and base terminals of an NPN transistor 280 via resistor 288 and diode 282 and diode 284. The collector terminal is connected to terminal 2 of regulator circuit 161 through collector resistor 287. The circuit 280 generates an output pulse at its emitter terminal only during the time that both generator 240 and limiter circuit 260 are applying pulses to diodes 282 and 284 and to the base terminal of transistor circuit 280 through resistor 288. That is, when limiter circuit 260 switches off, the cathode terminal of diode 284 is placed at approximately zero volts. This, in turn, switches transistor circuit 280 off. Thus, circuit 280 can be viewed as performing an "AND" function upon the outputs of generator 240 and limiter circuit 260.

The positive output pulse from transistor circuit 280 is applied to the base of an NPN transistor 170. The emitter terminal of transistor 170 of the start-up circuit connects to the common reference ON through emitter resistors 164 and 166. The collector terminal connects to transformer primary 150 and to a snubber network consisting of series connected capacitor 172 and resistor 174 which operates to suppress transients.

Secondary Circuits

The secondary windings 200 and 201 with the turns indicated (i.e., 10 turns, 3 turns) step down the primary voltages so as to provide the desired +15VDC, −12VDC and +5VDC output supply voltages. These windings have polarities which are opposite to that of primary winding 150 which permit energy transfer to the loads to take place only during transformer flyback. Additionally, as explained herein, such loads are disconnected from the secondary circuits while energy is being stored by the primary windings.

The secondary windings 200 and 201 connect to the +5 volt, −12 volt and +15 volt rectifier and regulator circuits of blocks 231, 221 and 201. More specifically, the secondary windings 200 and 201 connect to the anodes of diodes 203 and 212, respectively. Asddition- ally, the secondary winding 200 connects to the cathode of diode 223 of block 221.

Referring to block 201, as shown, the cathode of rectifier diode 203 connects to filter capacitor 206. The rectifier output junction formed by the cathode of diode 203 and capacitor 206 connects to the input terminal 2 of an adjustable linear voltage regulator circuit 208. The appropriate threshold voltage is established by the output of the voltage divider network which includes resistors 207 and 209 through 212 which connect to terminals 1 and 3 of regulator circuit 208, as shown. The circuit 208 is constructed from a standard integrated circuit designated as LM250, manufactured by National Semiconductor Corporation. The output terminal 3 of circuit 208 which provides the +15 VDC output voltage connects to the output terminal +15 VDC and to a further filter capacitor 214. The output terminal +15 VDC connects to the load 80.

Referring to block 221, the anode of rectifier diode 223 connects to output filter capacitor 227. In a similar fashion, the rectifier output junction formed by the anode of diode 223 and capacitor 227 of block 221 connects through a resistor 225 to the input terminal 3 of a negative 12 volt voltage regulator circuit 222. Additionally, terminal 3 connects to a noise filter capacitor 224. The circuit 222 is constructed from a standard integrated circuit designated as uA7912 manufactured by Fairchild Camera and Instrument Corporation. The output terminal 2 of circuit 222 which provides the −12 VDC output voltage connects to the output terminal −12 VDC and to a further filter capacitor 226. The output terminal −12 VDC connects to the load 82.

Lastly, referring to block 231, the cathode of rectifier decode 232 connects to output filter capacitor 234. The rectifier output junction formed by the cathode of diode 232 and capacitor 234 connects to the +5 VDC terminal through a further filter network which includes an inductor 236 and capacitor 238. The +5 VDC terminal connects to the load 80.

Voltage to Pulse Width Converter 30

The circuits of block 30 include a regulating pulse width modulator (PWM) circuit 300. This circuit which corresponds to block 301 is constructed from a standard integrated circuit designated as LM3524, manufactured by National Semiconductor Corporation. The integrated circuit includes a 5-volt voltage regulator, a control amplifier, an oscillator pulse width modulator, a phase splitting flip-flop, dual alternating output switches and current limiting and shut down circuits.

The oscillator of the circuit 301 utilizes an external resistor 302 which connects to RT terminal 6 to establish a constant charging current into an external capacitor 303 which connects to CT terminal 7. This network provides a linear ramp voltage on the capacitor 303 which is used as a reference for a comparator included therein. Additionally, the oscillator may be synchronized to an external +3-volt clock signal applied to the oscillator output terminal 3 from sync input terminal via a series network which includes resistors 304 and 305, capacitor 306 and clamping diode 307.

As seen from FIG. 2, VREF terminal 16 which corresponds to the output of the 5-volt regulator of circuit 301 connects through a resistor 311 to one end of a variable resistor 312 which connects to a ground reference through a resistor 313. The voltage regulator which is powered from +15 VDC applied to (VIN) terminal 15 provides the +5 VDC reference voltage at terminal 16 and to all the internal circuits of circuit 301. The output terminal of variable resistor 312 applies approximately +2.5 VDC signal to the non-inverting (NI) input terminal 2 of an error amplifier circuit included therein. The second input terminal of the control amplifier which corresponds to inverting (INV) terminal 1 is connected to a voltage divider network which includes resistors 314 and 315. The resistors 314 and 315 divide down the voltage from the +5 VDC output terminal to approximately +2.5 volts.

The control amplifier of circuit 301 is a differential input amplifier. The output of the amplifier is connected via terminal 9 to a compensation network which includes resistor 309 and capacitors 308 and 310. The control amplifier generates an error voltage by comparing the voltage on terminals 1 and 2 relative to the reference voltage applied to terminal 2. The difference voltage is amplified and applied to one input of a comparator circuit. The other input of the comparator circuit connects to CT terminal 7 for receiving the ramp voltage generated by the oscillator circuit. The comparator generates an output pulse whose width is a function of the relationship between the +5 VDC output voltage and the 5-volt reference voltage.

The comparator output pulse is applied to the collector (COL B) and emitter (EM B) terminals 13 and 14 of one of the dual output transistor switches of circuit 301. As shown in FIG. 2, the emitter (EM B) terminal 14 connects to ground through the input diode of the optocoupler 321 and an emitter resistor 316 while the collector (COL B) terminal connects to the +5-volt reference voltage through a collector resistor 317.

The terminals 4, 5 and 8 of circuit 301 connect to a common reference voltage which corresponds to ground or zero volts. The shutdown circuits and other output switch (A) are not used.

The variable width pulse at terminal 14 is applied to the input terminal 1 of optical coupler circuit 32 of block 320. The other input terminal 2 of circuit 321 connects to the common reference voltage. The optical coupler base and emitter terminals 6 and 4 connect as shown to a resistor 322. The output collector terminal 5 connects to the junction formed by load resistor 242 and diode 253.

In the preferred embodiment, optical coupler 321 is constructed from a standard circuit designated as CN51, manufactured by General Electric Corporation. The very high isolation characteristics of the circuit provides the desired coupling between PWM regulator circuit 300 and generator and limiter circuits 240 and 260 for controlling the operation thereof.

Initially, the circuit 300 produces no output pulse thereby placing coupler circuit 320 in an off state. Thus, output terminal 5 is unconnected (i.e., open). In response to an output pulse, coupler circuit 320 is switched on which generates an output pulse at terminal 5. As explained herein, this pulse synchronizes the on and off switching of generator 240 and limiter circuit 260 as a function of the difference between the supply output voltage and reference voltage.

DESCRIPTION OF OPERATION

With reference to FIG. 2 and the waveforms of FIGS. 3A through 3H, the operation of the preferred embodiment of the present invention will now be described. Before discussing the present invention, reference is first made to FIGS. 3A through 3E. These Figures illustrate the operating characteristics of prior art startup circuits. That is, they illustrate the voltage and current provided to the unit being controlled or driven which in the present invention corresponds to voltage regulator circuit 161 of FIG. 1.

Figure 3A:
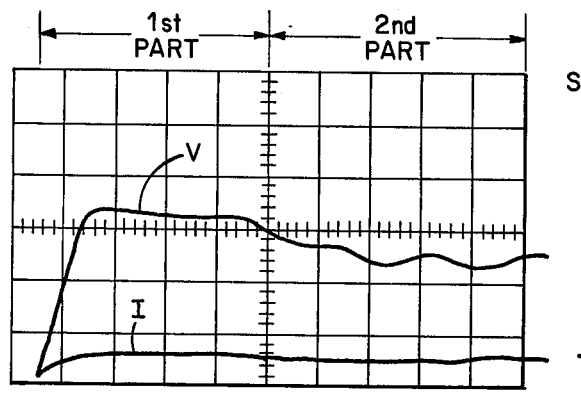
FIGS. 3A through 3H illustrate a series of waveforms used to explain the operation of the start circuit of the present invention.

In greater detail, FIG. 3A illustrates voltage (V) and current (I) delivered by the prior art arrangement at maximum or full load conditions when the input AC line voltage is at a value approximating 100 volts. The voltage and current waveforms are divisible into two parts. The first part corresponds to the start period and the second part corresponds to the operation period. The start period which aproximates 10 milliseconds is the time it takes to provide the required start voltage to turn on the controlled circuit (e.g. voltage regulator circuit 161). Thereafter, the power supply attains its full output voltage and continues operation so as to maintain the required output voltage notwithstanding changes in line and load conditions.

Figure 3B:
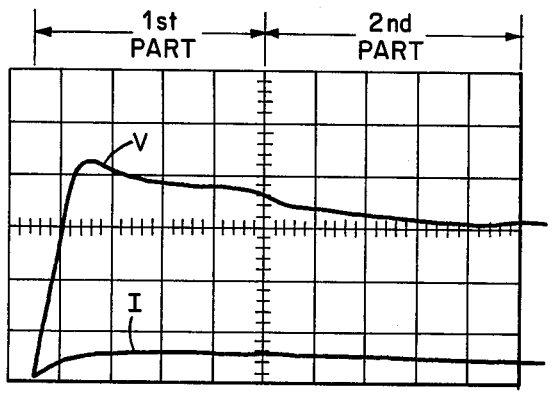

From FIG. 3A, it is seen that during the start period, a voltage of 160 volts and a current of 16 milliamperes is provided. Following start-up, a steady state voltage value of 130 volts and the same current of 16 milliamperes is provided during power supply operation at full load. FIG. 3B illustrates the voltage and current provided by the prior art arrangement start-up at full load conditions when the input AC voltage is at a maximum value approximately 135 volts.

From these Figures, it is seen that the prior art start-up arrangement expends or dissipates power all the time. The steady state power dissipated ranges from 2 watts (i.e., 130 volts×0.016a) to 3.2 watts (160 volts×0.02a).

Figure 3C:
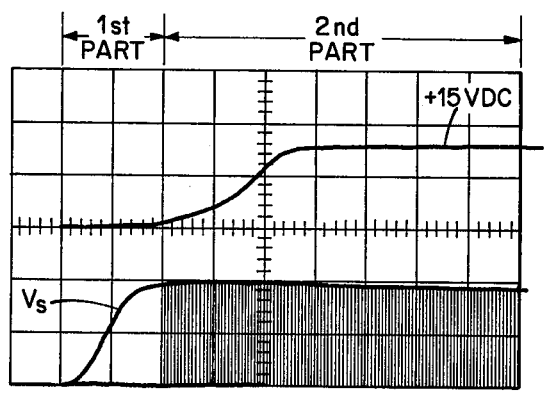

FIG. 3C illustrates the characteristics of the start voltages generated by the prior art start-up arrangement, voltage VS supplied from the transformer primary windings during full load conditions when the input AC voltage is at a nominal value approximately 120 volts. In the preferred embodiment, the transformer primary winding corresponds to winding 158 in FIG. 2.

As discussed previously, the power dissipation of the prior art start-up arrangement can produce overheating when the supply is used in conjunction with certain units such as completely enclosed CRT terminal units, particularly when operated with high values of input line voltages. By including the drive voltage start circuits 180 in the start-up section of FIG. 1, the voltage and current operating characteristics of FIGS. 3E and 3F together with the desired result waveforms of FIG. 3D are obtained.

Figure 3D:
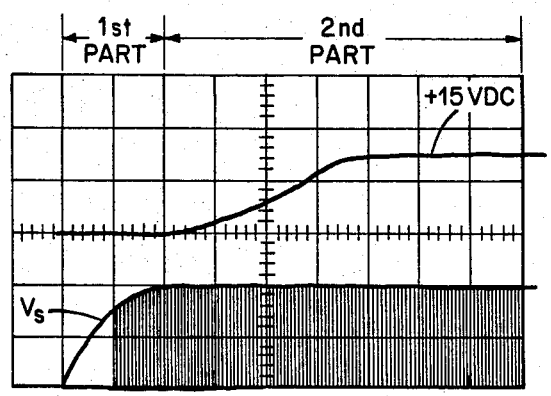
Figure 3E:
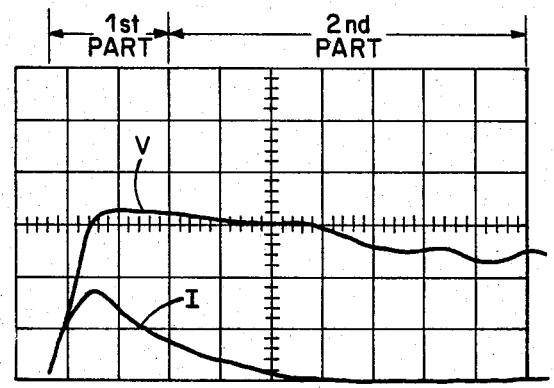
Figure 3F:
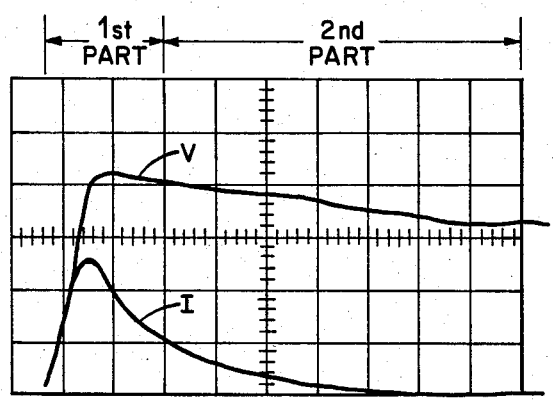

In greater detail, the circuit 180 of FIG. 2 provides the required start-up control voltage V during the first part of FIGS. 3E and 3F until such time as the power supply is operating and the primary winding 158 is supplying the appropriate voltage VS in FIG. 3D to sustain operation.

The operation of the start-up section of the present invention is as follows. When the power supply is turned on, AC voltage is applied to the full wave bridge rectifier 140. The rectified AC voltage appearing at terminals OP and ON approximates 160 volts. This voltage charges input filter capacitor 142 to 160 VDC. Concurrently therewith, capacitor 181 begins charging to the same 160 VDC through series resistor 184 and regulator circuit 161.

Thus, during the build-up of voltage on capacitor 181, the charging current generated by network 180 is applied to terminal 1 of voltage regulator circuit 161. The voltage and current produced is as illustrated in FIGS. 3E and 3F. The waveforms labeled V correspond to the voltage across points A and B in FIG. 2. The waveforms labeled I correspond to the current flowing through resistor 184. FIG. 3E illustrates network current and voltage at full load and low line conditions. FIG. 3F illustrates network current and voltage at full load and high line conditions.

It will be noted that during the first part of the waveforms of FIGS. 3E and 3F, the capacitor 181 provides a high instantaneous current which is between 50-75 milliamperes. This current dissipates to zero as illustrated by the second part of the waveforms of FIGS. 3E and 3F. Thus, a high instantaneous current is provided during the 10 millisecond short start-up period while no current is provided during the operation period. This occurs when capacitor 181 is fully charged at which time there is no more current flowing through the capacitor. The size of capacitor 181 is selected so that enough energy is available to get through the start-up period at which time the source of energy is winding 158. This is illustrated by the waveforms of FIGS. 3G and 3H.

Figure 3G:
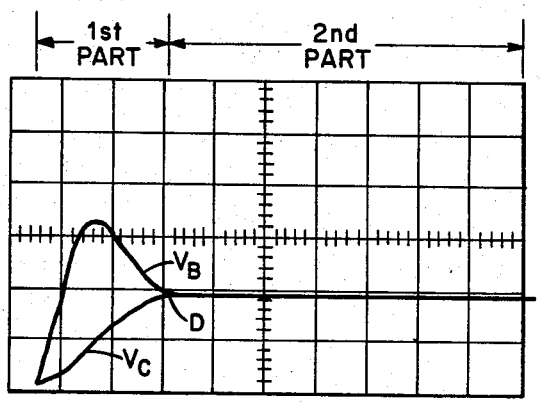
Figure 3H:
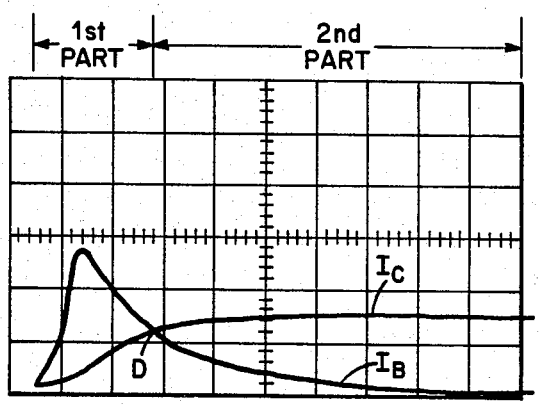

Referring to FIG. 3G, it is seen that at point A, the voltage VC from winding 158 applied via diode 160 exceeds the voltage VB from network 180. As seen from FIG. 3H, winding 158 at point A begins to control the amount of current applied to terminal 1 of regulator circuit 161. That is, the current IC from winding 158 begins to exceed the current IB provided by network 180.

It will be appreciated that FIG. 3G shows the average value of IC. The actual waveform is made up of 5 microsecond wide pulses having a value of 0.3 amperes occurring every 60 microseconds.

The advantage of providing a higher value of instantaneous current during start-up permits operation at lower line voltages (i.e., brown out condition) and component tolerances to be more relaxed as concerns minimum gain requirements. Because of the short period of time such current is being generated, the power dissipation requirements are not exceeded.

As soon as the voltage and current of network 180 reach the desired values, regulator circuit 161 generates a positive going output voltage at terminal 2. At this time, the coupler circuit 320 is in an off state. Hence, the time required to charge and discharge capacitor 250 will be established by resistors 246 and 248 respectively.

When the voltage at terminal 2 applied to the VCC terminals 8 of the pulse generator 240 and limiter circuit 260 is sufficient, they operate to generate positive going output pulses at terminal 3.

These positive going pulses cause drive transistor 280 to apply a pulse to the base of transistor 170. This pulse is sufficient to switch transistor 170 into saturation, since there is no current flowing through primary windings of the transformer.

It will be noted that the voltage on filter capacitor 142 is now applied across primary winding 150 of the transformer causing current to flow therethrough. Capacitor 142 begins to discharge through transistor 170. By means of transformer action, a voltage of 18 VDC is induced in step down primary winding 158 as shown by waveform VS of FIG. 3D. This positive voltage when applied to previously reverse biased diode 160 causes it to conduct and to provide current corresponding to the waveform IC in FIG. 3.

When regulator circuit 161 receives the normal operating voltage, it operates to clamp or maintain its output voltage to the regulated 12 VDC value. Hence, the 12 VDC is applied as the supply voltage to terminal 8 of the circuits 240 and 260 causing them to start normal operation wherein it produces pulses at a fixed frequency established by the oscillator of circuit 301.

Initially, generator circuit 240 produces pulses having a longer than normal pulse width, since the output capacitors of circuits 201, 221 and 231 and loads have not been brought up to normal operating conditions. That is, until the +5 VDC, −12 VDC and +15 VDC output voltages reach their desired values, no error voltage is generated by circuit 300 as explained herein for altering the pulse width of circuit 240.

Briefly, summarizing the above, it is seen that the start-up section 15 applies sufficient supply operating voltage and current to regulator circuit 161 causing it to generate an output voltage sufficient to result in an output pulse from the circuits of block 24. This voltage pulse, in turn, saturates transistor 170 which causes the start-up circuit section 15 to produce a second source of voltage and current for the normal operation of the regulator circuit 161.

At the end of the first cycle of operation defined by the pulse width output of circuit 280, transistor 170 switches off. This interrupts the current flow through primary winding 150 causing a reverse emf or back voltage to be generated in winding 158 by the magnetic field produced in the opposite direction. Also, this includes voltages of the polarity required for forward biasing diodes 203 and 232. The result is that output filter capacitors of circuits 201, 221 and 231 begin charging. After a number of cycles of operation of circuit 24 at long pulse width, the +5 VDC output supply voltage in the secondary increases above the 5 VDC reference voltage applied to terminal 1 of circuit 301. At this time, circuit 300 operates to generate an output pulse at terminal 14 having a shorter pulse width. this voltage switches on coupler circuit 320 which results in the triggering of generator 240 and circuit 260. At this time, since the pulse applied to these circuits is shorter, the result is that transistor 170 remains on for a shorter period of time thereby reducing the duration of the energy storage cycle.

As soon as the circuit 301 detects that the +5 output supply voltage is at the desired operating value, it switches off coupler circuit 321. This turns off generator 240 and limiter circuit 260. Thus, by turning the circuits of diode 24 on and off as a function of the pulses generated by circuit 301, thepower supply is able to respond to changes in line and load conditions.

By way of illustration, the component values selected for the preferred embodiment of the primary side of the power supply of the present invention are as listed in the table below.

TABLE

| | | |
|---|---|---|
| resistor | 141 | 75 kilohms |
| capacitor | 142 | 200 microfarads |
| capacitor | 143 | .01 microfarads |
| resistor | 302 | 20 kilohms |
| capacitor | 162 | 1 microfarad |
| capacitor | 163 | 1 microfarad |
| resistor | 164 | 1 ohm |
| resistor | 166 | 1 ohm |
| capacitor | 172 | .0022 microfarads |
| resistor | 174 | 6.2 kilohms |
| capacitor | 181 | 4.7 microfarads |
| resistor | 182 | 75 kilohms |
| resistor | 184 | 1 kilohm |
| resistor | 242 | 2 kilohms |
| resistor | 245 | 16 kilohms |
| resistor | 246 | 2 kilohms |
| resistor | 248 | 39 kilohms |
| capacitor | 250 | .0015 microfarads |
| capacitor | 256 | 200 picofarads |
| capacitor | 258 | 36 picofarads |
| capacitor | 266 | .0015 microfarads |
| resistor | 286 | 100 ohms |
| resistor | 287 | 20 ohms |
| resistor | 288 | 200 ohms |
| capacitor | 307 | 1 microfarad |
| capacitor | 308 | .56 microfarads |
| variable resistor | 312 | 1 kilohm potentiometer |
| resistor | 314 | 3.3 kilohms |
| resistor | 316 | 200 ohms |

In summary, the invention provides a novel self starting power supply which minimizes the amount of energy required during normal operation notwithstanding line and changes in load conditions. This arrangement of the invention reduces the complexity of the power supply to a minimum while facilitating its construction from standard integrated circuits.

Many changes may be made to the preferred embodiment of the subject invention. For example, the embodiment may be modified for use with different input line voltages and use to provide any desired output voltages. The invention may be used with other types of energy transfer arrangements (e.g. non-flyback) and other types of switching regulator circuits as, for example, voltage regulator circuits employing fixed pulse width and variable frequency.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of features.

What is claimed is:

1. A switching regulator power supply coupled to a source of input AC line voltage through a DC source of rectified and filtered AC line voltage, said supply including a start-up circuit coupled to said DC source, said start-up circuit comprising:

primary transformer winding means connected to said DC source;

voltage regulator circuit means connected to said primary transformer winding means and operative to generate a predetermined output voltage for enabling said primary transformer winding means to be switched on and off during each cycle of operation; and control circuit network means connected to said primary transformer winding means, to said DC source and to said voltage regulator circuit means, said control network circuit means being operative during a first time interval in response to said rectified and filtered AC line voltage from said DC source to apply a predetermined value of current to said voltage regulator circuit means, said voltage regulator circuit means in response to said current being operative to produce said predetermined output voltage for starting the switching of said primary transformer winding means during a first cycle of operation, said primary transformer winding means being enabled by said predetermined output voltage to cause current to flow therethrough generating a feedback voltage and current for application to said voltage regulator circuit means during said first cycle of operation and said control circuit network means being conditioned by said DC source to reduce said current to a minimum value during a second time interval when said feedback voltage and current is sufficient in value to enable said regulator circuit means to produce said predetermined output voltage for sustaining the normal switching of said primary transformer winding means during said each cycle of operation.

2. The supply of claim 1 wherein said supply further includes pulse generator circuit means for generating pulses for controlling the switching of said primary transformer winding means, said pulse generator circuit means connected to said voltage regulator circuit means and the said primary transformer winding means, said pulse generator circuit means being operative in response to said predetermined output voltage to generate a first pulse and succeeding pulses for enabling said current to flow through said primary transformer means during said first cycle and each succeeding cycle of operation.

3. The supply of claim 1 wherein said control circuit network means includes:

capacitor means connected to said DC source and to said voltage regulator circuit means, said capacitor means being operative in response to said rectified and filtered AC voltage from said DC source to charge to the value of said rectified and filtered AC voltage and during said charging to apply said current to said voltage circuit means during said first time interval, said first time interval corresponding to an interval of time required to charge said capacitor means to said value of rectified and filtered AC voltage and said capacitor means when charged to said value of rectified and filtered AC voltage providing said minimum value of current during said second interval.

4. The supply of claim 3 wherein said capacitor means is a capacitor selected to have a value of capacitance for providing a pulse of current during said first interval sufficient in magnitude to cause said regulator circuit means to produce said predetermined output voltage for switching on said pulse generator circuit means.

5. The supply of claim 3 wherein said network circuit means includes first resistive means connected in series with said capacitor means and said regulator circuit means, said resistive means being selected to have a value of resistance for limiting the amount of said charging current applied to said regulator circuit means.

6. The supply of claim 5 wherein said network circuit means includes second resistive means connected across said capacitor means, said second resistive means providing a path for discharging said rectified and filtered line voltage stored by said capacitor means when said supply is turned off.

7. The supply of claim 3 wherein each cycle of operation consists of an energy storage portion and an energy transfer portion, said start-up circuit further including:

switching transistor circuit means connected to one end of said DC source and to said pulse generator circuit means, said switching transistor circuit means in response to said pulses enabling the flow of current through said primary transformer winding means and wherein said primary transformer winding means includes:

a primary winding with one end connected to the other end of said DC source and the other end connected to said switching transistor circuit means to permit said flow of said current in a first direction during said energy storage portion and in the other direction during said energy transfer portion; and, a feedback primary winding having one end connected to said other end of said DC source and the other end connected to said voltage regulator circuit means and to said network circuit means, said feedback primary winding being AC coupled to said primary winding so as to provide said feedback voltage and current during said energy storage portion of said each cycle of operation.

8. The supply of claim 3 wherein said first time interval corresponds to a predetermined number of said cycles of operation required for charging said capacitor means to said value of rectified and filtered AC voltage and wherein said second interval corresponds to the number of cycles of operation over which said supply remains in operation.

9. The supply of claim 3 wherein said capacitor means provides a large instantaneous pulse of current during said first time interval enabling said supply to start operation at lower values of input AC line voltages and wherein said capacitor means provides a zero value of current during said second time interval.

10. The supply of claim 9 wherein said first time interval is short and said second time interval approximates the length of time said supply is operational thereby minimizing the amount of energy dissipated by said supply.

11. The supply of claim 10 wherein said first time interval approximates 10 milliseconds.

12. The supply of claim 1 wherein said DC source includes full wave rectifier means and capacitor means connected across said rectifier means for storing and filtering said rectified AC voltage.

13. The supply of claim 2 wherein each cycle of operation consists of an energy storage portion and an energy transfer portion, said supply further including:
   secondary circuit means for providing a desired output voltage to a load, said secondary circuit means being AC coupled to said primary transformer winding means so as to transfer energy to said load during said energy transfer portion of each cycle; and
   conversion means coupled to said secondary circuit means and to said pulse generator circuit means, said conversion means being operative to generate an output signal for varying a predetermined characteristic of said pulses generated by said pulse generator circuit means for controlling the transfer of energy in accordance with changes in said load.

14. The supply of claim 13 wherein said predetermined number of cycles in said first time interval corresponds to the length of time from the turn-on of said supply to the time that the amount of energy being transferred equals the amount of energy required by said load at which said output signal is zero.

15. The supply of claim 13 wherein said predetermined characteristic is pulse width and wherein said pulse generator circuit means couples to said conversion means, said pulse generator circuit means being operative to generate said pulses at a predetermined fixed rate of frequency and vary the pulse width as a function of said output signal from said conversion means.

16. The supply of claim 13 wherein said predetermined characteristic is frequency and said pulse generator circuit means couples to said conversion means, said generator circuit means being operative to generate said pulses having a fixed pulse width and vary the frequency of said pulses as a function of said output signal from said conversion means.

17. A switching regulator power supply coupled to a source of input AC line voltage through a DC source of rectified and filtered AC line voltage, said supply comprising:
   pulse circuit means for generating pulses for controlling the switching of said supply; and
   start-up circuit means connected to said DC source and to said pulse circuit means, said start-up circuit means including:
      primary transformer winding means connected to said DC source and to said pulse circuit means;
      voltage regulator circuit means connected to said primary transformer winding means and connected to apply a predetermined output voltage to said pulse circuit means; and,
      passive control circuit means connected to said primary transformer winding means, to said DC source and to said voltage regulator circuit means, said passive control network circuit means being operative during a first time interval in response to said rectified and filtered AC line voltage from said DC source to apply a pulse of current having a first predetermined characteristic to said voltage regulator circuit means for causing said voltage regulator circuit means to produce said predetermined output voltage required for starting said pulse circuit means, said pulse circuit means being operative in response to said predetermined output voltage to generate a first pulse and succeeding pulses enabling current to flow through said primary transformer means for generating feedback voltage and current for application to said regulator circuit means, and
      said passive control circuit network means being conditioned by said DC source to reduce said current to a minimum value during a second time interval when said feedback voltage and current are sufficient in value to condition said regulator circuit means to produce said predetermined output voltage for sustaining the normal operation of said pulse circuit means.

18. The supply of claim 17 wherein said control circuit network includes:
   a capacitor connected to said DC source and to said voltage regulator circuit means, said capacitor being operative in response to said rectified and filtered AC voltage from said DC source to charge to the value thereof and during said charging to apply said current to said voltage regulator circuit means during said first time interval, said first time interval corresponding to an interval of time required to charge said capacitor means to said value of rectified and filtered AC voltage, and said capacitor means when charged to said value of rectified and filtered AC voltage providing said minimum value of current during said second interval.

19. The supply of claim 18 wherein said capacitor is selected to have a value of capacitance for providing said pulse of current during said first interval sufficient in magnitude to cause said regulator circuit means to produce said predetermined output voltage for switching on said pulse generator circuit means.

20. The supply of claim 18 wherein said network circuit means includes a first resistor connected in series with said capacitor and said regulator circuit means, said first resistor being selected to have a value of resistance for limiting the amount of said charging current applied to said regulator circuit means.

21. The supply of claim 18 wherein each cycle of operation consists of an energy storage portion and an energy transfer portion, said start-up circuit further including:
   switching transistor circuit means connected to one end of said DC source and to said pulse circuit means, said switching transistor circuit means enabling the flow of current through said primary transformer winding means in response to said pulses and wherein
   said primary transformer winding means includes:

a primary winding with one end connected to the other end of said DC source and the other end connected to said switching transistor circuit means to permit said flow of current in a first direction during said energy storage portion and in the other direction during said energy transfer portion; and, a feedback primary winding having one end connected to said other end of said DC source and the other end connected to said voltage regulator circuit means and to said network circuit means, said feedback primary winding being AC coupled to said primary winding so as to provide said feedback voltage and current during said energy storage portion of said each cycle of operation.

22. The supply of claim 18 wherein said first time interval corresponds to a predetermined number of cycles of operation required for charging said capacitor means to said value of rectified and filtered AC voltage and wherein said second interval corresponds to the number of cycles of operation over which said supply remains in operation.

23. The supply of claim 18 wherein said capacitor provides a large instantaneous pulse of current during said first time interval enabling said supply to start operation at lower values of input AC line voltages and wherein said capacitor means provides a zero value of current during said second time interval.

24. The supply of claim 23 wherein said first time interval is short and said second time interval approximates the length of time said supply is operational thereby minimizing the amount of energy dissipated by said supply.

25. The supply of claim 18 wherein said supply further includes:

secondary circuit means for providing a desired voltage to a load, said secondary circuit means being AC coupled to said primary transformer winding means so as to transfer energy to said load during said energy transfer portion of each cycle; and conversion means coupled to said secondary circuit means and to said pulse circuit means, said conversion means being operative to generate an output signal for varying a predetermined characteristic of said pulses generated by said pulse circuit means for controlling the transfer of energy in accordance with changes in said load.

26. The supply of claim 25 wherein said predetermined number of cycles in said first time interval corresponds to the length of time from the turn-on of said supply to the time that the amount of energy being transferred equals the amount of energy required by said load at which said output signal is zero.

27. A switching regulator power supply connected to a DC source of rectified and filtered AC voltage and having a cycle of operation consisting of a energy storage portion and an energy transfer portion, said supply comprising:

a pulse generator circuit having a supply voltage input terminal and an output terminal, said circuit means generating pulses;

start-up circuit section connected to said DC source and to said pulse generator circuit, said start-up circuit section including:

a switching transistor citcuit connected to one end of said DC source and to said output terminal of said pulse generator circuit, said transistor circuit providing current during said energy storage portion in response to said pulses;

transformer means having a primary winding with one end connected to the other end of said DC source and the other end connected to said switching transistor circuit to permit current flow in a first direction during said energy storage cycle and in a second direction during said energy transfer portion, a feedback primary winding having one end connected to said other end of said DC source and the other end, said feedback primary winding being AC coupled to said primary winding so as to provide feedback voltage and current during said energy storage portion of said cycle;

a voltage regulator circuit having an input terminal and an output terminal, said input terminal being connected to said feedback primary winding and said output terminal being connected to said supply voltage terminal of said pulse generator circuit; and, a passive control circuit network connected at one end to said primary transformer winding means, to said DC source and at the other end to said input terminal of voltage regulator circuit in common with said feedback primary winding, said control network circuit being operative during a start-up interval in response to said DC source to apply a pulse of current having a first characteristic to said input terminal of said voltage regulator circuit, said voltage regulator circuit being operative in response to said pulse of current to produce said predetermined output voltage causing said pulse generator circuit to provide a first and successive pulses enabling current to flow through said primary transformer means for generating said feedback voltage and current during said energy storage portion of each cycle for application to said input terminal of said regulator circuit, and said control circuit network being conditioned by said DC source to reduce said current to a zero value during an operation interval when said feedback voltage and current are sufficient in value to condition said regulator circuit to produce said predetermined output voltage for conditioning said pulse generator circuit to generate said pulses at a nominal frequency.

28. The supply of claim 27 wherein said passive control circuit network includes:

a capacitor connected at one end to said DC source and at the other end to said input terminal of voltage regulator circuit, said capacitor being operative in response to said rectified and filtered AC voltage from said DC source to charge to the value thereof and during said charging to apply said pulse of current to said voltage regulator circuit during said start-up time interval, said start-up time interval corresponding to an interval of time required to charge said capacitor means to said value of rectified and filtered AC voltage and said capacitor when charged to said value of rectified and filtered AC voltage providing said zero value of current during said operation interval.

29. The supply of claim 28 wherein said capacitor is selected to have a value of capacitance for providing said pulse of current during said start-up time interval sufficient in magnitude to cause said regulator circuit to produce said predetermined output voltage for switching on said pulse generator circuit.

30. The supply of claim 27 wherein said network circuit includes a first resistor connected in series with said capacitor and said input terminal of said regulator circuit, said first resistor being selected to have a value of resistance for limiting said charging current applied to said regulator circuit.

31. The supply of claim 27 wherein said start-up time interval corresponds to a predetermined number of cycles of operation required for charging said capacitor to said value of rectified and filtered AC voltage and wherein said operation interval corresponds to the number of cycles during which said supply remains in operation.

32. The supply of claim 27 wherein said capacitor provides a large instantaneous pulse of current during said start-up time interval enabling said supply to start operation at lower values of input AC line voltages.

33. The supply of claim 27 wherein said supply further includes:
secondary circuit means for providing a desired voltage to a load, said secondary circuit means being AC coupled to said primary winding so as to transfer energy to said load during said energy transfer portion of each cycle; and
conversion means coupled to said secondary circuit means and to said pulse generating circuit, said conversion means being operative to generate an output signal for varying a predetermined characteristic of said pulses generated by said pulse generating circuit for controlling the transfer of energy in accordance with changes in said load.

34. The supply of claim 33 wherein said predetermined number of cycles in said start-up time interval corresponds to the length of time from the turn-on of said supply to the time that the amount of energy being transferred equals the amount of energy required by said load at which said output signal is zero.

* * * * *